United States Patent [19]

Rekers

[11] Patent Number: 5,494,577
[45] Date of Patent: Feb. 27, 1996

[54] MEMBRANE BIOREACTOR WITH GAS LIFT SYSTEM

[75] Inventor: Casper J. N. Rekers, Hardenberg, Netherlands

[73] Assignee: Stork Friesland B.V., Gorredijk, Netherlands

[21] Appl. No.: 360,378

[22] Filed: Dec. 21, 1994

[30] Foreign Application Priority Data

Dec. 24, 1993 [NL] Netherlands .................. 9302260

[51] Int. Cl.⁶ ............................................. B01D 63/00
[52] U.S. Cl. ............................ 210/321.8; 210/321.79; 210/321.64; 210/321.69; 210/323.2; 210/330; 210/106; 210/221.2; 210/261
[58] Field of Search ..................... 210/106, 321.64, 210/321.69, 321.79, 321.8, 321.88, 321.89, 500.23, 221.2, 323.2, 330, 340, 256, 261

[56] References Cited

U.S. PATENT DOCUMENTS

| | | | |
|---|---|---|---|
| 4,756,875 | 12/1988 | Tajima et al. | 210/500.23 |
| 5,192,456 | 3/1993 | Ishida et al. | 210/256 |
| 5,209,844 | 5/1993 | Zievers et al. | 210/323.2 |

FOREIGN PATENT DOCUMENTS

| | | |
|---|---|---|
| 0510328A3 | 10/1992 | European Pat. Off. . |
| 0523498A1 | 1/1993 | European Pat. Off. . |
| 2583406 | 12/1986 | France . |
| 3918267 | 12/1990 | Germany ................ 210/323.2 |
| 61293504 | 12/1986 | Japan . |
| 2053183 | 9/1983 | United Kingdom . |
| WO80/01484 | 7/1980 | WIPO . |

*Primary Examiner*—Ana M. Fortuna
*Attorney, Agent, or Firm*—Deveau, Colton & Marquis

[57] ABSTRACT

An apparatus is described for treating polluted water. The apparatus comprises a supply system for polluted water; an activated-sludge reactor; one or more filter membrane modules; an air supply system and a discharge system for the treated water. The filter membrane modules comprise hollow membranes within a casing. Said filter membrane modules on one side adjoin the activated-sludge reactor and on the other side adjoin air distribution means. The activated-sludge reactor communicates, via a bypass line, with a sludge receiving container which adjoins the air distribution means. The apparatus functions in such a way that the water to be treated and air supplied are flowing in the same direction through the hollow membranes, the permeate flowing through the membranes towards the space between the casing and the membranes, where it is discharged via permeate discharge system.

13 Claims, 2 Drawing Sheets

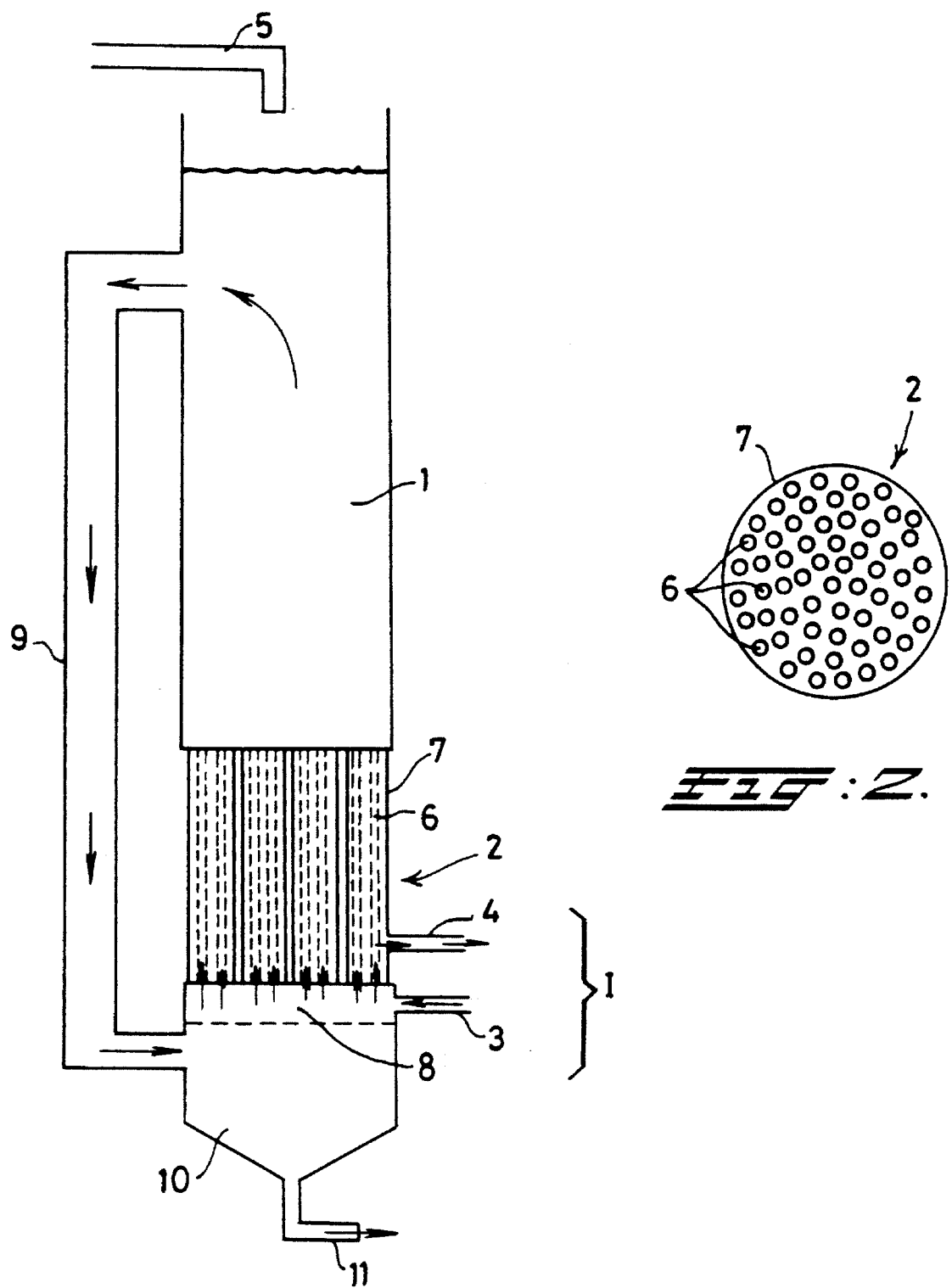
Fig:1.
Fig:2.

MEMBRANE BIOREACTOR WITH GAS LIFT SYSTEM

BACKGROUND OF THE INVENTION

The present invention relates to an apparatus for treating polluted water, at least comprising a supply system for water to be treated; an activated-sludge reactor; one or more filter membrane modules; an air supply system and a discharge system for permeate passed by the membranes of the modules.

An apparatus of this type is known from the European Application EP-A-0 510 328. The apparatus described herein comprises a treatment tank, the activated-sludge reactor, in which a number of filter membrane modules are suspended parallel to one another with a certain spacing. The filter membrane modules are preferably constructed in the form of porous flat filter plates, the outermost walls being formed by the membrane. The filter membrane modules are suspended in a housing which is open both at the top and the bottom. The water to be treated is filtered through the membranes by making use of a vacuum pump on the filtrate side in order for the water, which passes the membranes from the reactor and arrives in the porous space of the filter plates, to be drawn off as clean water. In order to prevent undesirable deposition and accretion of layers on the outside of the membranes, provision is made of an air supply system which blows air in the upward direction. Since said air supply is a very critical factor and both too low and too high an air supply rate result in deposition and accretion of layers on the outside of the membrane, provision is additionally made in the said application for air distribution means. The aim is to achieve, with the aid of said means, a uniform distribution of the air stream across the membranes, as a result of which deposition of solid particles is largely prevented.

The abovementioned apparatus does have the drawback, however, that even if the said air distribution means are used, the flow coefficient of the water to be treated and the air supplied is not readily controllable. It is generally found that the mass transfer coefficient between membrane plate and liquid is relatively low, which means rapid deposition and accretion of fouling layers on the membrane. Besides, the apparatus according to EP-A-0 510 328 has the drawback that the water to be treated has to be drawn through and from the filter membrane modules by means of a pump. A further important drawback is that the periodical cleaning required of the membrane plates requires these to be removed from the reactor.

SUMMARY OF THE INVENTION

The object of the present invention is to avoid the abovementioned drawbacks, to which end the invention is characterized in that the one or more filter membrane modules, comprising one or more hollow membranes with a casing in which one or more permeate discharge systems are disposed, on one side adjoin the activated-sludge reactor and on the other side adjoin air distribution means, and in that the activated-sludge reactor is connected, by means of a bypass line, to a sludge receiving container which adjoins the air distribution means and on which there is a discharge line for removing excess mass, in such a way that the water to be treated and air supplied are flowing in the same direction and essentially parallel to the membrane surface through the hollow interior of the membranes, a portion of the water to be treated, the permeate, flowing through the membranes towards the space which is situated between the casing and the membranes and is discharged via the one or more permeate discharge systems.

The activated-sludge reactor, the filter membrane modules, the air distribution means and the sludge receiving container therefore communicate with one another in the apparatus according to the present invention as separate elements. The apparatus functions in such a way that the water to be treated and the air supplied flow co-currently through the membranes. In this case, in contrast to EP-A-0 510 328, the water-air mixture to be treated flows through the hollow interior of the membranes and is filtered by flowing through the membrane to the space which is bounded by the casing and the one or more membranes. The simultaneous introduction of air and water to be treated into the membranes results in a readily controllable flow coefficient which, if the supply of the water to be treated and the air is adjusted properly, ensures a high mass transfer coefficient, as a result of which deposition and accretion of layers on the inner wall of the membranes will be very low.

In particular, the activated-sludge reactor; the one or more filter membrane modules; the air distribution means and the sludge receiving container are disposed above one another in the order specified, the activated-sludge reactor being in the topmost position.

As a result of the abovementioned elements being thus positioned, a pressure differential across the membrane of, for example, one atmosphere is effected. Under the influence of the hydrostatic pressure and the operation of the air supply and distribution means, a flow of the water to be treated is then produced in the apparatus. The water to be treated will flow from the activated-sludge reactor via the bypass line to the sludge receiving container, where it is pushed upwards through the filter membrane modules under the influence of the air supply and distribution means. This flow, caused by the supplied air, within the precisely defined hollow membranes results in a high mass transfer coefficient at the membrane surface. Consequently, a high flux through the membranes can be achieved.

The membranes in the filter membrane modules can be constructed in a plate-like manner, as in the European publication mentioned previously. Expediently, however, the one or more filter membrane modules each comprise a casing accommodating a large number of tubular membranes, and the casing of each filter membrane module is provided with a permeate discharge.

The use of such tubular filter membrane modules ensures that, in comparison with filter membrane modules having a different shape, the flow coefficient of the water to be treated with the air is higher and much more readily controllable and distributed more uniformly across the surface.

Advantageously, the tubular membranes have an internal diameter of 3–25 mm and preferably an internal diameter of 3–10 mm.

In an attractive embodiment, the air distribution means consist of a chamber-like cavity which is delimited by a first end face at the side of the one or more filter membrane modules and a second end face at the side of the sludge receiving container, there being arranged in the cavity, adjoining the filter membrane modules situated above, corresponding filter membrane modules whose casing is, however, permeable to air and which open into the sludge receiving container.

In such an embodiment the air distribution means comprise one or more membranes with casings which are similar to the filter membrane modules and which are located in a cavity at which the air supply is located. The casing of the membranes in this case is permeable to air, so that air can be supplied within the membranes.

Advantageously, the membrane situated in the chamber-like cavity differs from the membrane of the filter membrane module situated above.

The membrane is then in the cavity not permeable to the water flowing through, but does admit air from the outside to the wastewater.

In a following embodiment, the air distribution means consist of spray nozzles which interact with the one or more filter membrane modules.

In this case, just below each filter membrane module a spray nozzle is placed which is connected to an air supply. The water to be treated, which is present there at the same height and next to the spray nozzle is pushed by, and thus together with, the air from the spray nozzle into the membranes.

Expediently, the one or more filter membrane modules on one side detachably adjoin the activated-sludge reactor and on the other side detachably adjoin the air distribution means.

Advantageously, the sludge receiving container comprises a conical bottom, on which the discharge line is situated for removing excess mass.

As a result it is possible for part of the biomass which is present in the water to be treated and in the activated-sludge reactor and which is passed to the sludge receiving container via the bypass line, to settle and to be discharged via the discharge line, thus preventing an undue increase of biomass in the apparatus. Although part of the biomass is constantly being removed, the total amount of biomass which is present in the apparatus according to the present invention is relatively high, compared to other known apparatus for treating polluted water. In known apparatus, generally 1–4 grams of biomass is present per liter of water to be treated, whereas in the apparatus according to the present invention 20–40 g/l of biomass is present. This means that if the apparatus according to the present invention is used, $1/10$ of the reactor volume of a known apparatus is sufficient for treating an identical amount of polluted water.

Preferably, the overall height of the apparatus is 3–15 m. At this height it will be possible to achieve in the apparatus the desired pressure differential across the membrane of approximately one atmosphere.

In an advantageous embodiment, the filter membrane modules present in the apparatus can be separately connected, without moving them out of their position, to a cleaning circuit, which at least comprises a pump and a storage vessel for cleaning fluid.

Thus it is possible for the separate membrane modules present in the apparatus to be connected, without interrupting the purification process of the polluted water and without moving them out of position, to a cleaning circuit at least comprising a pump and a storage vessel for cleaning fluid, and to be cleaned, in order to be reused subsequently in the water purification process.

In an advantageous embodiment, the activated-sludge reactor is divided, with the aid of a partition which is parallel to the axis of the activated-sludge reactor, into at least two parts, it being possible to fill the parts with liquids whose compositions mutually differ.

In such an embodiment it is possible to fill part of the activated-sludge reactor with cleaning fluid, while the other part is filled with wastewater. If the air supply and distribution means interacting therewith have been taken off-line and the underside of the filter membrane modules has been fitted with discharge means interacting therewith, selected filter membrane modules which adjoin that part of the reactor which is filled with cleaning fluid can be cleaned, while in the remaining part of the apparatus the treatment process of the polluted water continues.

BRIEF DESCRIPTION OF THE DRAWINGS

The present invention will be explained below in more detail with reference to an example and the accompanying drawing, in which:

FIG. 1 shows a schematic sectional view of the apparatus according to the invention;

FIG. 2 shows a schematic sectional view of a tubular filter membrane module;

DESCRIPTION OF THE PREFERRED EMBODIMENTS

Figure 3:
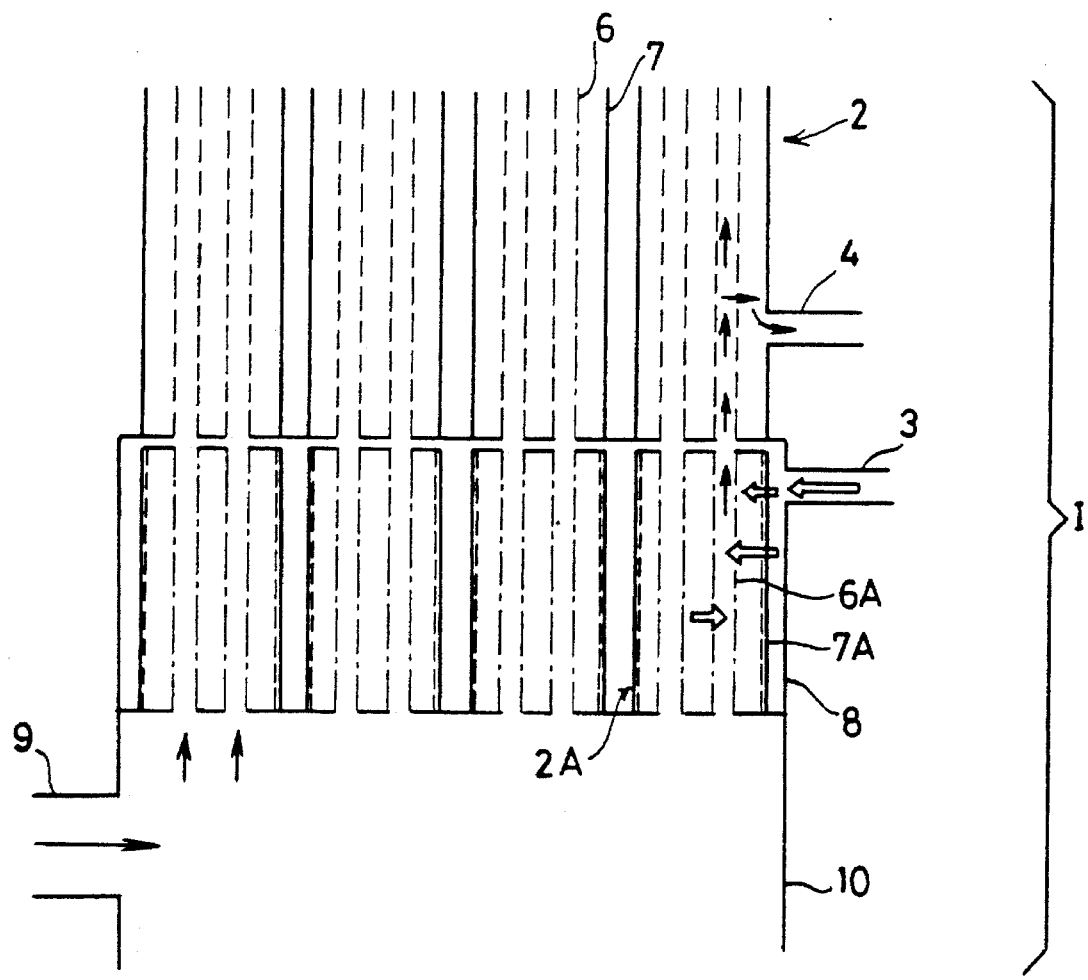
FIG. 3 shows a particular embodiment of the air distribution means.

FIG. 1 shows an apparatus for the treatment of polluted water according to the invention. The apparatus comprises an activated-sludge reactor 1 which holds water to be treated. Adjoining the underside of the activated-sludge reactor 1 there are a number of tubular filter membrane modules 2 which comprise a number of tubular membranes 6 with a tubular casing 7. Although this is shown in the figure for only one filter membrane module, a permeate discharge system 4 is present at each filter membrane module 2. At the underside, air distribution means 8 adjoin the filter membrane modules 2; the air therefor is supplied via air supply system 3. Underneath the air distribution means 8 there is finally an adjoining sludge receiving container 10 having a conical bottom, at which a discharge line 11 is located for discharging excess biomass. The activated-sludge reactor communicates, with the aid of bypass line 9, with the sludge receiving container 10. In FIG. 1, a bypass line has been sketched; alternatively, however, a jacket-like bypass can be employed. The wastewater to be treated is supplied via supply system 5.

The apparatus according to the invention functions as follows. The water to be treated is brought, via supply system 5, to the activated-sludge reactor 1. There it will mix with the water already present and the biomass and will be carried along with the flow through bypass line 9 and end up in sludge receiving container 10. Part of the biomass present in the water to be treated will settle into the conical bottom of the sludge receiving container 10, and the remaining part of the water to be treated, with the biomass, will be pushed up in the membranes 6 together with and by the air supplied by the air distribution means 8. This upward thrust, also known as "air lift", is such that no deposition and accretion of layers can take place on the membranes 6, the thrust being so strong that the water to be treated, which is present in the activated-sludge reactor, does not run into the membranes from above. Conversely the water, as mentioned previously, will be caused by the hydrostatic pressure and by the air lift of the air distribution means 8 to flow mainly from the activated-sludge reactor 1 via the bypass line 9 to the sludge receiving container 10, where it is then pushed upwards through the membranes 6.

The pressure which prevails in the apparatus and by means of which the water together with the air is pushed into the membranes is such that the filtration takes place through the membranes without a pump being required for this purpose. The permeate which is present between the membranes 6 and the casing 7 is discharged via permeate discharge 4.

FIG. 2 schematically shows a top view of a tubular filter membrane module 2. This comprises a large number of tubular membranes 6 and a tubular casing 7. The membranes 6 are permeable to the purified water, the casing 7 is not permeable to water.

FIG. 3 shows a particular embodiment of the air distribution means 8. These in this case consist of a chamber-like cavity which is delimited by filter membrane modules 2 on one side, by the sludge receiving container 10 on the other side and by a casing. Within said cavity there are also disposed, in line with and corresponding with the filter membrane modules 2 already present, short filter membrane modules 2A which run as far as the sludge receiving container 10. The difference between these filter membrane modules 2A and filter membrane modules 2 outside the cavity is, however, that within the cavity the housing 7A is permeable to air and that the membranes 6A differ from the remainder of the membrane 6. This difference of the membrane 6A is such that the membrane during operation does not let any liquid through from the inside to the outside, while it does let air through from the outside to the inside. If air is supplied into the cavity under a certain pressure via the air supply system 3, it will penetrate through the housing 7A and the membranes 6A as far as the inside of the membranes, where the air moves upwards in a very finely dispersed state in well-balanced mixture with the water to be treated.

Figure 4:
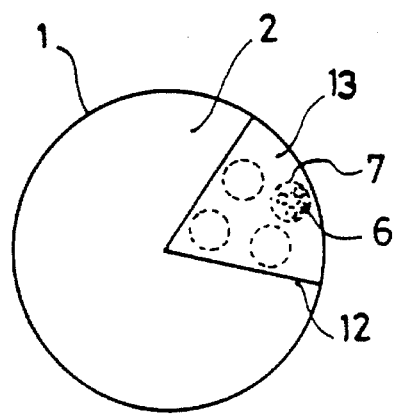
FIG. 4 shows a schematic top view of the apparatus according to the invention, in which a partition is arranged in the activated-sludge reactor.

FIG. 4 finally shows a schematic top view of the apparatus according to the invention, in which a partition 12 is fitted in the activated-sludge reactor. In this embodiment it is possible to fill the two parts of the activated-sludge reactor with different liquids. If part 13 is filled with cleaning fluid and the air distribution means situated in line with said part are connected to the cleaning circuit comprising a pump and a storage vessel for cleaning fluid, the cleaning fluid can be circulated through the filter membrane modules and via the storage vessel, in order to clean the membranes. The remaining part of the apparatus can at the same time remain "operational", so that the wastewater is treated continuously. Once the filter membrane modules have been cleaned, the partition 12 can be moved, so that a subsequent number of filter membrane modules can be cleaned, while the filter membrane modules already cleaned are once more brought on-line in the processing treatment.

What is claimed is:

1. Apparatus for treating polluted water, comprising: a supply system for polluted water; an activated-sludge reactor; one or more filter membrane modules; an air supply system and a discharge system for discharging permeate passed through the membranes of the modules, wherein the one or more filter membrane modules comprises one or more hollow membranes within a casing in which one or more permeate discharge systems are disposed, wherein the one or more filter membrane modules are adjoined on one side to the activated-sludge reactor and are adjoined on the other side to an air distribution means, and wherein the activated-sludge reactor is connected by means of a bypass line to a sludge receiving container which adjoins the air distribution means and on which there is a discharge line for removing excess sludge mass which settles in said sludge receiving container, in such a way that the water to be treated and air supplied are flowing in the same direction and essentially parallel to the membrane surface through the hollow interior of the membranes, and wherein permeate flowing through the membranes towards a space situated between the casing and the membranes is discharged via the one or more permeate discharge systems.

2. Apparatus according to claim 1, wherein the activated-sludge reactor is disposed above and in contact with the one or more filter membrane modules which are disposed above and in contact with the air distribution means which is disposed above and in contact with the sludge receiving container.

3. Apparatus according to claim 1, wherein the one or more filter membrane modules each comprise a casing accommodating a large number of tubular membranes, and the casing of each filter membrane module is provided with a permeate discharge.

4. Apparatus according to claim 3, wherein the tubular membranes have an internal diameter of 3–25 mm.

5. Apparatus according to claim 3, wherein the tubular membranes have an internal diameter of 3–10 mm.

6. Apparatus according to claim 1, wherein the air distribution means consists of a cavity which is delimited by the one or more filter membrane modules on one side and by the sludge receiving container on another side, there being arranged in the cavity, adjoining the filter membrane modules, corresponding filter membrane modules disposed within a casing which is permeable to air and which opens into the sludge receiving container.

7. Apparatus according to claim 6, wherein the membrane situated in the cavity differs from the membrane of the filter membrane module situated above.

8. Apparatus according to claims 1, wherein the air distribution means consist of spray nozzles which interact with the one or more filter membrane modules.

9. Apparatus according to claim 1, wherein the one or more filter membrane modules are on one side detachably adjoined to the activated-sludge reactor and are on the other side detachably adjoined to the air distribution means.

10. Apparatus according to claim 1, wherein the sludge receiving container comprises a conical bottom, on which the discharge line is situated for removing excess mass.

11. Apparatus according to claims 1, wherein the overall height of the apparatus is 3–15 m.

12. Apparatus according to claim 1, wherein the filter membrane modules present in the apparatus can be separately connected, without moving them out of their position, to a cleaning circuit which at least comprises a pump and a storage vessel for cleaning fluid.

13. Apparatus according to claim 1, wherein the activated-sludge reactor is divided by a partition into at least two parts such that each of the pans can be filled with liquids whose compositions mutually differ.

* * * * *